May 22, 1956 — C. E. HEMMINGER — 2,746,909
HYDROFORMING
Filed Jan. 31, 1955
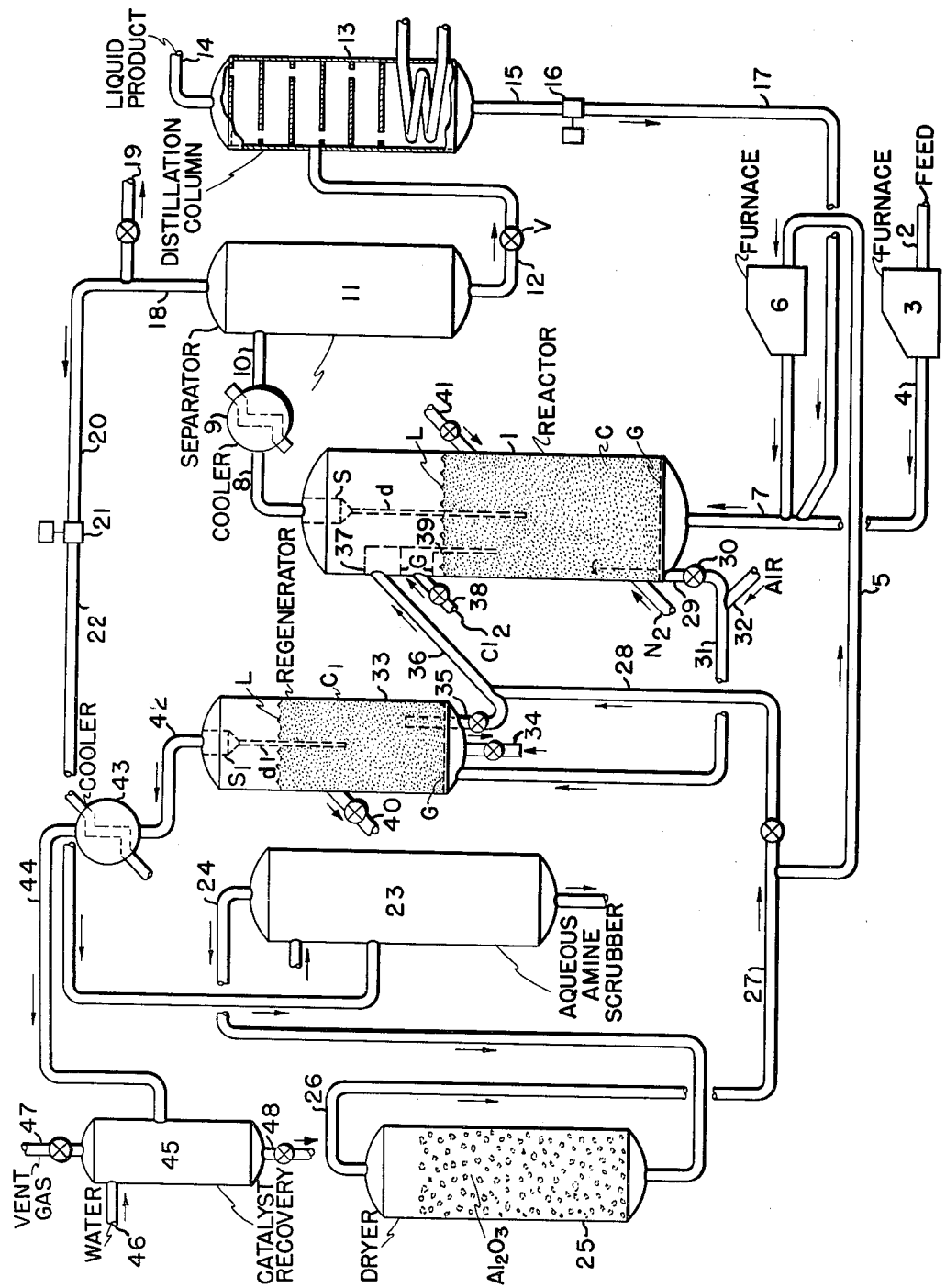
Charles E. Hemminger — Inventor
By J. Cashman — Attorney

2,746,909

HYDROFORMING

Charles E. Hemminger, Westfield, N. J., assignor to Esso Research and Engineering Company, a corporation of Delaware Application January 31, 1955, Serial No. 485,150

6 Claims. (Cl. 196—50)

The present invention relates to improvements in hydroforming. More particularly, it relates to hydroforming in the presence of a platinum group metal catalyst, which catalyst is disposed in the form of a fluidized bed in a hydroforming zone, and the essence of the invention is in the concept of regenerating or reactivating the catalyst so as to maintain it at a high level of activity in spite of the fact that it is utilized under very severe conditions of operation, particularly, with respect to the relatively low pressures employed and the relatively low recycle gas rates.

The hydroforming of naphthas is a matter of record and commercial practice. Most of the hydroforming plants in operation in the United States employ either a catalyst containing molybdenum oxide carried on alumina or platinum carried on alumina. Insofar as is known, many of the commercial hydroforming units employing a platinum containing catalyst are of the non-regenerative type; in other words, the processes are operated under very high pressures, say, of the order of 500 p. s. i., and employing from 5000 to probably 7000 standard cubic feet of hydrogen per barrel of oil fed to the reaction zone. The use of high pressures and high hydrogen gas recycle rates tends to repress the hydroforming operation so that yields and product quality are not as high as they would be where the operation would be carried out at substantially lower pressures and lower hydrogen gas recycle rates. This is due, of course, to the fact that hydroforming involves dehydrogenation of naphthenes to form the corresponding aromatics.

In brief compass, the present invention is of the regenerative type, that is to say, it provides means for regenerating the platinum group metal catalyst so that it may be used indefinitely without having to interrupt the process and rework the catalyst as is the case in the non-regenerative type of operation. The reworking of the catalyst as currently practiced involves dissolving the base or carrier in a suitable solvent and filtering off the platinum. The recovered platinum is then reimpregnated in freshly prepared alumina or other carrier. In other words, the original carrier is destroyed and, of course, the cost of the catalyst replacement is thereby increased.

Another important feature of the present invention involves means for stripping the regenerated catalyst to remove adsorbed hydrogen and $CO_2$ before the catalyst is returned to the hydroforming zone.

Another feature of the present invention involves drying and purifying the recycled hydrogen gas.

Another important feature of the present invention which distinguishes over the non-regenerative process is that the hydroforming zone is operated under a pressure of about 200 pounds, preferably, but at substantially lower pressures than those employed in current practice. This low pressure operation effects important economies in that it reduces the amount of equipment necessary, principally expensive gas compressors.

Another important feature of the present invention involves treating regenerative catalyst with dry hydrogen or recycled gas to remove $CO_2$ and $H_2O$, which materials adversely affect the activity and selectivity of the catalyst. It is believed that the $CO_2$, if present in the reaction zone, is reduced by hydrogen or some other agent to form CO, which is definitely a catalyst poison. Water is also formed in the reaction which is deleterious to the catalyst. Furthermore, hydrogen tends to reduce $SO_2$ and/or $SO_3$ which may be formed on the catalyst during the regeneration thereof when a feed containing sulfur is processed, or in other words, the catalyst to be regenerated is not only contaminated with carbonaceous material but also with sulfur bodies. By stripping or contacting the regenerated catalyst with pure dry hydrogen containing gas, $SO_2$ and $SO_3$ on the catalyst is reduced and removed as $H_2S$. Furthermore, when the catalyst surface is saturated with hydrogen, carbon formation is suppressed.

Other and further features and objects of the invention will appear in the following more detailed description and claims read in conjunction with the accompanying drawing.

In the accompanying drawing there is depicted, diagrammatically, an apparatus layout in which a preferred modification of the present invention may be carried into effect.

Referring in detail to the drawing, 1 represents a hydroforming reactor provided with a foraminous member G, which supports a fluidized bed of catalyst C, the fluidized bed having an upper dense phase level at L. Gasiform material charged to the bottom of reactor 1 passes through grid G and serves to maintain the catalyst in the form of the said fluidized bed. In operation, a naphtha enters the present system through line 2 and thence passes through a suitable furnace 3 where it is heated to about reaction temperatures and thence withdrawn through line 4. Meanwhile, substantially pure and dry hydrogen-containing gas obtained from the product recovery system is charged from line 5, through a furnace 6, wherein it is heated, thence withdrawn and mixed with the oil in line 7. This mixture of oil vapors and hydrogen-containing gas passes up through the foraminous member G into the bed C, as previously indicated, and under conditions of temperature and pressure and residence time hereinafter set forth, the desired hydroforming reaction occurs. The crude product admixed with hydrogen, passes through the dense fluidized bed C into a disengaging space positioned between L and the top of the reactor 1, and in this space the main portion of the catalyst is separated from the gasiform and vaporiform material and descends toward the bed of catalyst C. Before withdrawing the crude product and gas from the reactor, it is forced through one or more cyclone separators S wherein catalyst still entrained is removed and returned to the bed of catalyst through one or more dip pipes d. The vapors substantially freed of entrained catalyst are withdrawn overhead from the reactor through line 8, thence cooled in 9 to a temperature sufficiently low to condense the normally liquid constituents. The cooled product is withdrawn from cooler 9, through line 10 and charged into a separation vessel 11. From separation vessel 11, a normally liquid material is withdrawn through line 12, carrying a pressure reducing valve V, and thereafter charged to a distillation column 13. The hydroformed product is recovered from distillation column 13, through line 14 and after further treating or handling by conventional means, this product is delivered to storage. High boiling material in distillation column 13 is withdrawn as bottoms through line 15, passed through a pump 16 and thence delivered via line 17 to line 7 for further processing in hydroforming zone 1.

With respect to the hydrogen-containing gas associated with the crude product in line 8, the same is recovered overhead from separation drum 11 via line 18. In order to prevent buildup of this gasiform material, a portion thereof may be rejected from the system through line 19. The gas to be recycled to the hydroforming zone is passed through line 20, a compressor 21 and line 22 into a scrubber 23 where it is treated with an aqueous solution of, say, ethanolamine or any alkaline solution for the purpose of dissolving out soluble sulfur bodies, such as $H_2S$. The scrubbed gas is then withdrawn from 23, through line 24 and passed into a dryer 25, wherein substantially all of the water associated with the gas is removed. The dry gas is then withdrawn from dryer 25, through line 26, and a portion of this gas is passed via line 27 into line 5, where, after reheating in furnace 6, it is returned to reaction zone 1. Another portion of the dry pure gas recovered from dryer 25 is passed via line 28 into contact with hot regenerated catalyst for the purpose of dislodging $H_2$ and CO and to saturate the catalyst surface with hydrogen in a manner which will be more fully explained presently.

There comes a time when the catalyst in reactor 1 becomes contaminated with carbonaceous solids and, perhaps, sulfur bodies, with the result that the activity and selectivity of the catalyst is impaired and reactivation of the said catalyst is, therefore, required. Toward this end, catalyst is withdrawn from reactor 1, through a standpipe 29 and controlled by a suitable valve 30. The standpipe 29 serves as a stripping zone and to strip the catalyst of volatile material a suitable gas, such as nitrogen, is charged to the standpipe 29 and passes upwardly countercurrently to the downflowing catalyst, whereby adsorbed and/or occluded volatiles are stripped from the catalyst. The stripped catalyst is charged into a stream of air flowing in 32 and carried into suspension into a regenerator 33 wherein the catalyst is formed into a dense fluidized bed $C_1$ extending from a foraminous member $G_1$ to an upper dense phase level $L_1$. It is best practice to use insufficient air in transport line 31 to burn all of the combustible material on the catalyst, for such procedure prevents overheating of the catalyst in the transport or transfer line 31. Secondary air is charged to the bottom of regenerator 33, through line 34 in order to provide sufficient oxygen-containing gas to effect substantially complete removal of combustible poisons on the catalyst.

Under conditions more fully set forth hereinafter, the catalyst in regenerator 33 is regenerated and reactivated. The regenerated catalyst is withdrawn from reactor 33, through standpipe 35 and charged into a line 36 which contains a stream of dry, substantially pure hydrogen-containing gas. The suspension of regenerated catalyst in line 36 is charged to a stripping zone 37 positioned as shown in an upper portion of vessel 1 in communication with the bed of catalyst C. In this final stripping zone, which stripping zone carries two grids G and in which zone the catalyst is fluidized by upflowing vapors and gases which pass through the said stripping zone. These vapors and gases, of course, are the crude product, namely, the hydroformed hydrocarbon vapors and hydrogen and other gases. The catalyst is thus freed of oxygen-containing components, such as CO, $CO_2$, $H_2O$ which are removed by the treatment of the dry hydrogen gas in transfer pipe line 36. The stripped material passes into the space between L and the top of the reactor and is withdrawn with the product vapors overhead. In order to improve the catalyst activity, particularly, where the catalyst contains platinum or palladium, a chlorine-containing material such as chlorine itself may be charged to stripper 37, through line 38. The stripped and regenerated catalyst passes into a pipe 39 in open communication with stripper 37, as shown, and then passes by gravity into the main body of catalyst C.

There comes a time when after long continued use, the platinum or other platinum group metal becomes lowered in activity usually due to the fact that, after numerous cycles, including a large number of regeneration phases, the crystalline size of the catalyst increases to a value of from 150 to maybe 250 A. units. At this particle size range, the catalyst is at a low level of activity. The catalyst, therefore, withdrawn through line 40 may be treated with dilute aqua regia in a slurry phase operation and with insufficient amount of liquid and/or acid to injure the alumina or other carrier, but sufficient to dissolve and redistribute the platinum or other platinum group material on the carrier in a form such that its crystalline size is below 50 A. units. This reactivation of the catalyst may be performed at room temperature and is a cost-saving improvement over prior practice wherein the carrier is dissolved away from the base and, therefore, destroyed, necessitating manufacture of a new carrier or base and the procurement of platinum or other group platinum metal in a water soluble form adapted for reimpregnation of the freshly prepared carrier.

The freshly prepared catalyst or the reactivated catalyst may be returned to reactor 1 via line 41.

Referring again to regenerator 33, the regeneration fumes pass from the bed of catalyst $C_1$, through a catalyst disengaging space, and the main bulk of entrained catalyst is separated in this phase and returned to the bed $C_1$. However, before these fumes are rejected from regenerator 33, they are forced through one or more cyclones $S_1$, where catalyst still entrained is separated and returned to the bed $C_1$ through one or more dip pipes $d_1$. The regeneration fumes are then withdrawn overhead through a line 42 and cooled to about room temperature in 43 and thence passed via line 44 into a scrubber 45 wherein the fumes flow upwardly against the downflowing liquid charged to scrubber 45 via line 46. This liquid may be either water or an oil, and this downflowing liquid scrubs out of the rising fumes catalyst fines still entrained therein, so that the vent gas withdrawn overhead from scrubber 45, through line 47, is substantially freed of the expensive platinum group metal catalyst. The slurry containing the catalyst is recovered from scrubber 45, through line 48 and delivered to filtering means or other liquid solids separating means to recover the catalyst contained in the slurry.

In order to explain the invention more fully, the following information is set forth as to operating conditions which give good results:

CONDITIONS IN REACTOR 1

| | Range | Preferred |
|---|---|---|
| Catalyst | 0.1 to 1.0% Pt. on $Al_2O_3$. | 0.2–0.6% Pt on $Al_2O_3$. |
| Particle size range of catalyst | 10 to 200 microns | 30 to 150 microns. |
| Temperature, °F | 850–975 | 900–950. |
| Pressure, p. s. i. | 50–500 | 150–325. |
| Residence time, lbs.oil/hr./lb. catalyst. | 0.5–10 | 2–5. |
| Standard cubic feet of $H_2$ fed to reactor per barrel of oil. | 2,000–10,000 | 3,000–7,000. |
| Concentration of $H_2$ in recycle gas, mol percent. | 80–95 | 85–90. |
| Lbs. of catalyst fed to reactor 1 from regenerator 33 per lb. of oil fed to the reactor 1 | 0.001 to 1.0 | 0.01 to 0.1. |
| Superficial velocity of gases and vapors passing upwardly in reactor 1, ft./sec. | 0.2 to 1.5 | 0.3 to 1.0. |

CONDITIONS IN REGENERATOR 33

| | | |
|---|---|---|
| Temperature, °F | 850 to 1,200 | 900 to 1,100. |
| Pressure, p. s. i. | Essentially same as reactor. | Essentially same as reactor. |
| Residence time, hours | 1 to 10 | 2 to 5. |

CONDITIONS IN LINE 36

Temperature and pressure essentially same as in regenerator 33.

Recycle gas to catalyst ratio—10 to 100 cu. ft. per lb. catalyst, preferably, 20 to 50 cu. ft. at standard conditions per lb. of catalyst.

Contact time in line 36 = 3 to 40 seconds, preferably, 5 to 15 seconds.

CONDITIONS IN STRIPPER 37

Temperature and pressure essentially same as in reactor 1.

Chlorine added=0.01 to 0.1 lb. per pound catalyst with 0.05 lb. per lb. catalyst preferred.

Example

A virgin naphtha may be processed according to the present invention. This naphtha may have the following inspection:

NAPHTHA INSPECTION

| | |
|---|---|
| Boiling range °F | 200–375 |
| Vol. percent naphthenes | 30 |
| Vol. percent paraffins | 60 |
| Wt. percent sulfur | 0.03 |
| Research octane number | 35 |

This naphtha may be treated at a temperature of 950° F. in a hydroforming zone containing a fluidized bed of a catalyst containing 0.5 wt. percent platinum and 99.5 wt. percent of alumina, which alumina is substantially all in the eta form. The catalyst has an average particle size of 65. A pressure of 200 p. s. i. may be maintained in the reaction zone and 4000 standard cubic feet of 90% $H_2$ is also fed to this zone. 0.05 part of regenerated catalyst substantially freed of water, sulfur and oxygenated compounds, may be fed to the reaction zone for each pound of oil fed. A $C_5+$ product may be obtained having the following inspection:

| | |
|---|---|
| Boiling range °F | 116–420 |
| Yield of $C_5+$ hydrocarbons based on feed, vol. percent | 84 |
| Wt. percent of sulfur in product | 0.0001 |
| Research octane number | 95 |

To recapitulate briefly, the present invention relates to improvements in the continuous hydroforming of naphthas, using a platinum group metal catalyst, which catalyst is in the form of a fluidized bed. The essence of the invention resides in the concept of maintaining the catalyst in a highly active state in spite of the fact that it is used in a process operated under very severe conditions of relatively low pressure and relatively low gas recycle rates.

What is claimed is:

1. A continuous method for hydroforming naphthas which comprises providing a fluidized bed of a platinum-containing catalyst in a hydroforming zone, contacting the said catalyst in the said zone with naphthas and added dry substantially sulfur-free hydrogen-containing gas, maintaining hydroforming conditions of temperature and contact time in said hydroforming zone, maintaining a pressure of from 150–325 p. s. i. in said hydroforming zone, removing catalyst contaminated with carbonaceous and other deposits from said hydroforming zone and conducting it to a regeneration zone, forming the catalyst into a fluidized bed in said last-named zone and treating it with an oxygen-containing gas at regeneration conditions of temperature, withdrawing catalyst from the regeneration zone, treating the said catalyst with a substantially dry and sulfur-free hydrogen-containing gas whereby a substantial portion of the sulfur and oxygen-containing material is stripped from the catalyst, thereafter transferring the catalyst to a stripping zone positioned in an upper portion of the hydroforming zone, treating the catalyst in said last-named zone with the product about to be removed from the hydroforming zone whereby sulfur and oxygen-containing materials still associated with the catalyst are substantially completely removed, returning the regenerated and stripped catalyst to the said fluidized bed in said hydroforming zone and recovering a hydroformed product from said hydroforming zone.

2. The method set forth in claim 1 in which the naphtha undergoing hydroforming contains substantial quantities of sulfur-bearing material.

3. The method set forth in claim 1 in which catalyst withdrawn from the hydroforming zone is treated with a nitrogen-containing gas in order to strip volatile material therefrom prior to the regeneration of said catalyst.

4. A continuous method for hydroforming naphthas which comprises providing a fluidized bed of a platinum-containing catalyst in a hydroforming zone, contacting the said catalyst in the said zone with naphthas and added dry substantially sulfur-free hydrogen-containing gas, maintaining hydroforming conditions of temperature and contact time in said hydroforming zone, maintaining a pressure of from 50–500 p. s. i. in said hydroforming zone, removing catalyst contaminated with carbonaceous and other deposits from said hydroforming zone and conducting it to a regeneration zone, forming the catalyst into a fluidized bed in said last-named zone and treating it with an oxygen-containing gas at regeneration conditions of temperature, withdrawing catalyst from the regeneration zone, treating the said catalyst with a substantially dry and sulfur-free hydrogen-containing gas whereby a substantial portion of the sulfur and oxygen-containing material is stripped from the catalyst, thereafter transferring the catalyst to a stripping zone positioned in an upper portion of the hydroforming zone, treating the catalyst in said last-named zone with the product about to be removed from the hydroforming zone whereby sulfur and oxygen-containing materials still associated with the catalyst are substantially completely removed, returning the regenerated and stripped catalyst to the said fluidized bed in said hydroforming zone and recovering a hydroformed product from said hydroforming zone.

5. The method set forth in claim 1 in which the regenerated and stripped catalyst is treated with a chlorine-containing material.

6. The method set forth in claim 4 in which the regenerated and stripped catalyst is treated with a chlorine-containing material.

References Cited in the file of this patent

UNITED STATES PATENTS

| | | |
|---|---|---|
| 2,074,311 | Moore | Mar. 16, 1937 |
| 2,406,112 | Schulze | Aug. 20, 1946 |
| 2,445,468 | Blohm et al. | July 20, 1948 |
| 2,479,110 | Haensel | Aug. 16, 1949 |
| 2,663,676 | Cardwell | Dec. 22, 1953 |
| 2,700,015 | Joyce | Jan. 18, 1955 |